(12) United States Patent
Herdendorf et al.

(10) Patent No.: US 8,176,794 B2
(45) Date of Patent: May 15, 2012

(54) UNMOUNTED HEAD GIMBAL ASSEMBLY CLAMPING PLATE

(75) Inventors: Brett Robert Herdendorf, Mound, MN (US); Ronald Eldon Anderson, Lakeville, MN (US)

(73) Assignee: Seagate Technology LLC, Cupertino, CA (US)

( * ) Notice: Subject to any disclaimer, the term of this patent is extended or adjusted under 35 U.S.C. 154(b) by 290 days.

(21) Appl. No.: 12/485,384

(22) Filed: Jun. 16, 2009

(65) Prior Publication Data

US 2010/0313673 A1    Dec. 16, 2010

(51) Int. Cl.
*G01N 3/02* (2006.01)
*G01D 3/00* (2006.01)
(52) U.S. Cl. ......................................... 73/856; 702/108
(58) Field of Classification Search .................. None
See application file for complete search history.

(56) References Cited

U.S. PATENT DOCUMENTS

| 7,505,860 | B2 * | 3/2009 | Herdendorf et al. .......... 702/108 |
| 7,520,168 | B2 * | 4/2009 | Obergfell et al. ................ 73/430 |
| 7,684,948 | B2 * | 3/2010 | Holwell et al. ................ 702/108 |
| 2005/0209797 | A1 | 9/2005 | Anderson et al. |
| 2007/0136021 | A1 | 6/2007 | Anderson et al. |
| 2007/0136022 | A1 | 6/2007 | Anderson et al. |
| 2007/0143054 | A1 | 6/2007 | Anderson et al. |
| 2007/0143055 | A1 | 6/2007 | Anderson et al. |
| 2007/0143056 | A1 | 6/2007 | Anderson et al. |
| 2007/0143057 | A1 | 6/2007 | Anderson et al. |
| 2008/0060186 | A1 | 3/2008 | Herdendorf et al. |
| 2008/0060445 | A1 | 3/2008 | Obergfell et al. |
| 2008/0061776 | A1 | 3/2008 | Collins et al. |
| 2008/0062564 | A1 | 3/2008 | Warn |

* cited by examiner

*Primary Examiner* — Andre Allen
(74) *Attorney, Agent, or Firm* — McCarthy Law Group

(57) ABSTRACT

An apparatus and associated method for non-permanently fixturing an unmounted head gimbal assembly (UHGA). A backing plate has a planar body defining a plurality of contact points, and a lip extending from the body that is operably alignable with the UHGA so that a force applied against the lip transfers through the body to urge each of the contact points against the UHGA.

20 Claims, 6 Drawing Sheets

UNMOUNTED HEAD GIMBAL ASSEMBLY CLAMPING PLATE

FIELD

The present embodiments relate generally to fixturing an unmounted head gimbal assembly.

BACKGROUND

Prior to attaching a head gimbal assembly (HGA) into a disc drive, it is desirable to test the functionality of the read and write transducers that reside on the HGA. HGAs that pass testing are permanently mounted to an actuator in the disc drive, such as by swaging an embossment ("boss") attachment feature of the HGA within an aperture in the actuator. Testing of an unmounted HGA (UHGA) must be done in a manner that preserves the attachment feature for subsequent mounting in the disc drive. Testing the UHGA is necessarily a high speed, highly automated, non-destructive testing process. Because UHGAs are small, fragile, and contain sensitive electronic components, they are susceptible to mechanical stress, electro-static discharge (ESD), environmental contamination, and other handling-related issues.

The testing process includes preliminary activities to align, configure, and prepare the UHGA for testing, followed by functionally testing the UHGA. Details of an apparatus and method for fixturing and testing the UHGA are disclosed in copending application US 2007/0143057, which is assigned to the assignee of this application and is incorporated by reference herein in its entirety. The UHGA must be aligned with respect to its operable read/write position, and then a head set operation is performed in which the UHGA is passed through a magnetic field to properly set the direction of the magnetic domains of the read and write transducers inside the head of the UHGA.

Initially, the UHGA's read and write transducers are electrically shorted together with a shunt tab, which resides on a flex circuit of the UHGA and protects the UHGA from ESD damage by ensuring that the components are held at a common voltage potential. This shunt tab must be broken or removed prior to functionally testing the UHGA. During the functional testing, the UHGA's flex circuit electrically interconnects the transducers to a preamplifier like that in the disc drive, the UHGA is loaded to a test disc, and data transfer testing is performed.

As the areal density increases with which data is stored to the disc, the transducers must be flown lower and more precisely than in the past. Variation in static positioning, such as in roll static attitude (RSA) and pitch static attitude (PSA), that in the past could be ignored as negligible now comes to the forefront as issues that must be addressed. The way the UHGA is non-permanently mounted for testing must also receive greater scrutiny to ensure that any parasitic resonance to the suspension and, in turn the head, of the UHGA is minimized.

The need to robustly mount the UHGA for testing and the need for a highly automated process are competing goals. Intermediate fixtures have been used in some previously attempted solutions, but there are adverse costs associated with loading, purchasing, and maintaining the extra tooling, and the intermediate mounting fixtures also create a larger mass and require an additional mechanical interface, both of which create other potential sources of positional variation and vibration during testing.

Improvements are needed in the manner in which the UHGAs are non-permanently fixtured during testing. It is to improvements in the art directed to solving that need that the present embodiments are directed.

SUMMARY

The present embodiments are generally directed to non-permanently fixturing an unmounted head gimbal assembly (UHGA).

In some embodiments a backing plate is provided for use in non-permanently fixturing a UHGA. The backing plate has a planar body defining a plurality of contact points, and a lip extending from the body that is operably alignable with the UHGA so that a force applied against the lip transfers through the body to urge each of the contact points against the UHGA.

In some embodiments a method is provided including the step of obtaining a backing plate having a planar body defining a plurality of contact points, and further having a lip extending from the body. The method further includes aligning the backing plate with a UHGA. The method further includes placing the aligned backing plate and UHGA on a reference surface. Finally, the method includes applying a force against the lip that transfers through the body to urge each of the contact points against the UHGA and which, in turn, urges the UHGA against the reference surface.

In some embodiments a UHGA tester is provided, having a segmented collet that expands as it is moved linearly with respect to a reference surface, and means for uniformly distributing a non-permanent fixturing force operably generated by the segmented collet to a base plate portion of the UHGA that includes a mounting feature for operably attaching the base plate to an actuator and also includes a supporting structure for supporting a flexible circuit.

DETAILED DESCRIPTION

The embodiments of the present invention are generally directed to an apparatus and associated methodology for handling an unmounted head gimbal assembly (UHGA) during processing operations such as testing and assembly and the like. A UHGA is constructed of a delicate material, and must be fixture to positionally locate it during the processing. The fixturing must be capable of rigidly positioning the UHGA without physically altering it to the point it cannot be used in the final goods.

The present embodiments provide a novel solution that non-permanently joins the UHGA to a backing plate, which lends strength and rigidity to the UHGA for fixturing. Wear and tear on the UHGA is prevented by the non-permanent joining of the two components. The backing plate advantageously has features that distribute a holding force uniformly throughout the UHGA.

Figure 1:
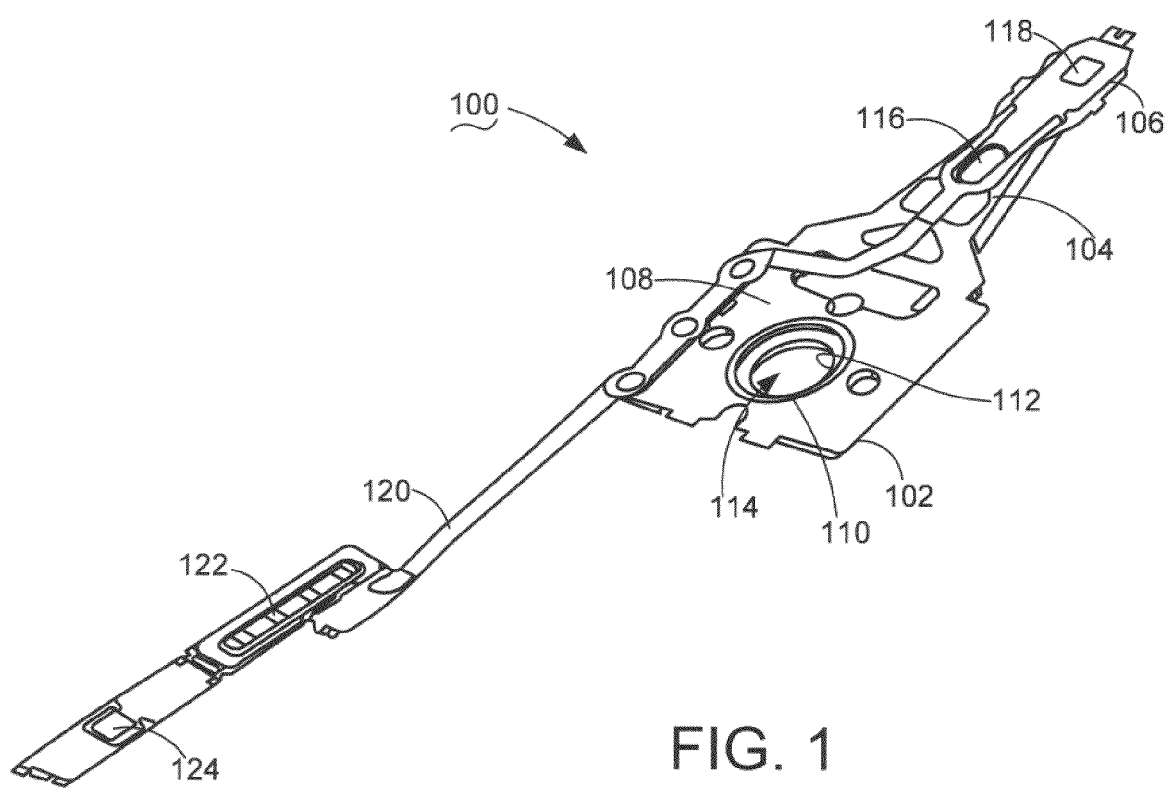
FIG. 1 is an isometric depiction of a UHGA suited for use in practicing embodiments of the present invention.

FIG. 1 is an isometric depiction of a UHGA 100. The UHGA 100 has an underlying support structure generally consisting of a base plate 102, a suspension 104, and a gimbal 106. The base plate 102 has a planar portion 108 in the midst of which is formed an attachment feature 110. The attachment feature 110 in these illustrative embodiments is a boss having a downwardly (as viewed in FIG. 1) angled flange 112 that is operably swaged to a supporting structure in the disc drive. An edge of the angled flange 112 defines a mounting feature opening 114 that is used as a reference datum for locating the UHGA 100 in a test station as described below.

The suspension 104 extends from the base plate 102 at a prescribed angle to impart a bias force acting toward the disc. That bias force is countered by the force of fluid currents created by the spinning disc, the effect of the opposing forces yielding the desired fly height for a robust data transfer relationship. The suspension defines an opening 116 that is used as another reference datum in conjunction with the opening 114 for locating the UHGA 100 in the test station.

The gimbal 106 extends from the suspension 104 and supports a head 118 that includes the read and write transducers. A flexible circuit 120 interconnects the head 118 with contact pads 122 for electrical connection to the preamplifier. The flexible circuit 120 also includes a shunt tab 124 for ESD protection prior to functional testing.

Figure 2:
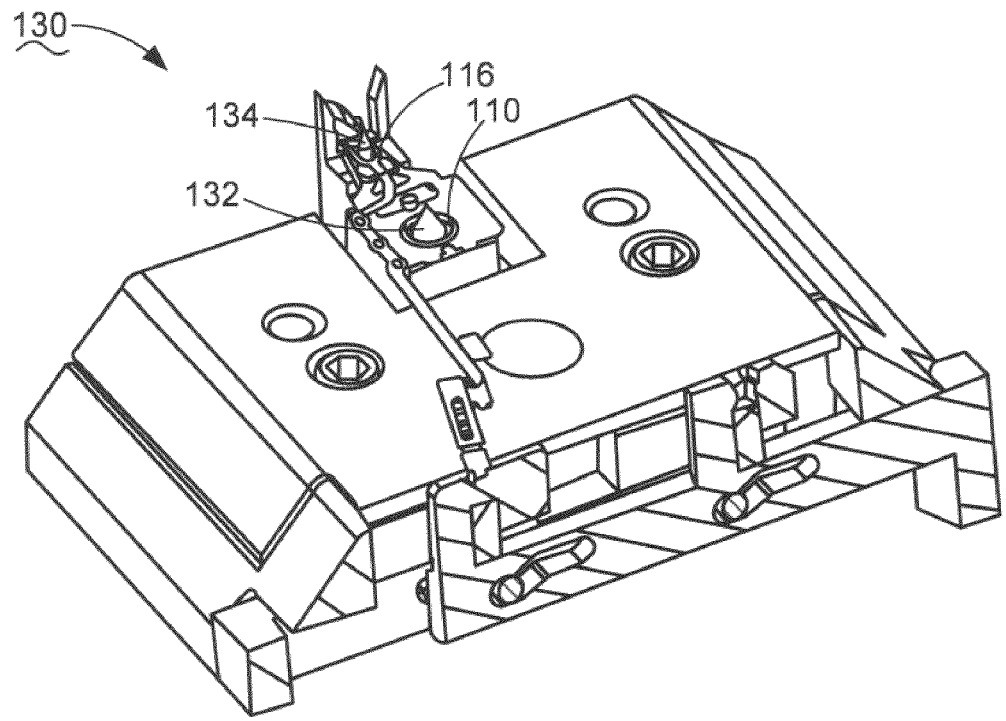
FIG. 2 is an isometric depiction of a precising fixture suited for use in practicing embodiments of the present invention.

FIG. 2 shows a precising station 130 of the test process disclosed in the aforementioned copending application. The UHGA 100 is precisely located by cooperation of a first tapered pin 132 being receivingly engaged within the mounting feature aperture 114 (FIG. 1), and a second tapered pin 134 being receivingly engaged within the opening 116 (FIG. 1) in the suspension 104. Once fixtured, a de-shunt plate (not depicted) reciprocates to exert a force causing the shunt tab 124 (FIG. 1) to break along a perforated side and fold it away from the flex circuit 120 (FIG. 1). As the de-shunt process is cycling, a headset operation is occurring as well, in which an electromagnet (not depicted) is shuttled to surround a portion of the UHGA 100 and create a magnetic field around the head 118 (FIG. 1).

Figure 3:
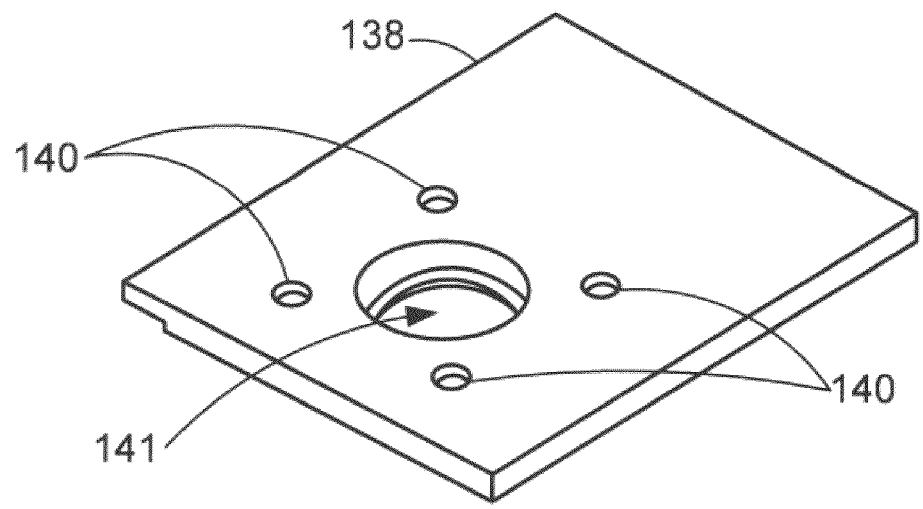
FIG. 3 is an isometric top view of a backing plate constructed in accordance with embodiments of the present invention.
Figure 4:
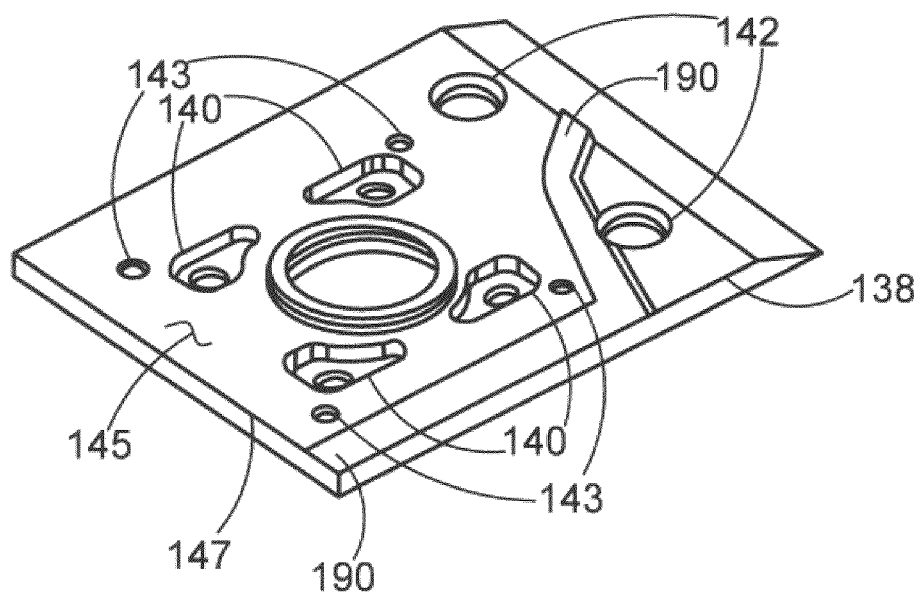
FIG. 4 is an isometric bottom view of the backing plate of FIG. 3.

After completion of the de-shunt and headset operations, the UHGA 100 is transferred to another fixture for functional testing. Since a known alignment of the UHGA 100 is obtained in the precising station 130, that alignment can advantageously be maintained while moving the UHGA 100 to a test station whose position with respect to the precising station 130 is known. FIG. 3 is an isometric top view of a backing plate 138 that is used to add structural integrity to the UHGA 100 for non-permanently securing it in the test station. The backing plate 138 has a pattern of four openings 140 that communicate a vacuum force from an end effector to pick the UHGA 100. The backing plate 138 also has an opening 141 that is used for gripping the backing plate 138 at a test station, as described below. FIG. 4 is an isometric bottom view of the backing plate 138 showing how the openings 140 can be enlarged to increase the vacuum gripping area with which the backing plate 138 interfaces with the UHGA 100. FIG. 4 also depicts a pair of reference openings 142 that can be used to precisely position the backing plate 138 so that its position is known when picked by an end effector. FIG. 4 also depicts a pattern of contact points 143 that are small protuberant features extending from a planar surface 145 defined by a main body portion 147 of the backing plate 138.

Figure 5:
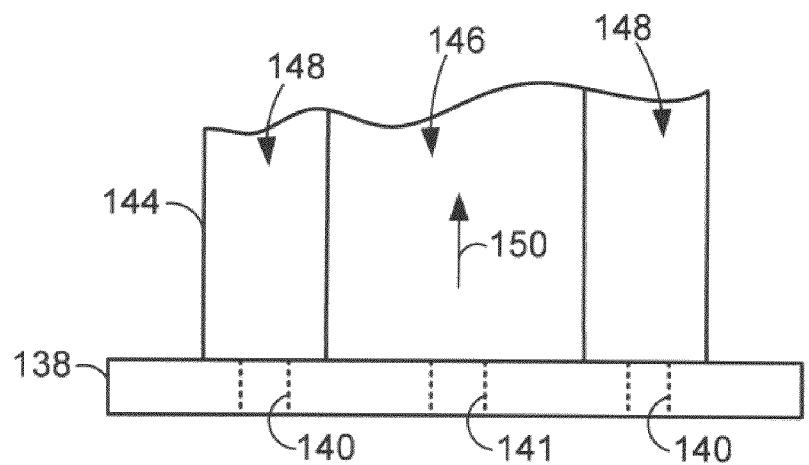
FIG. 5 is a diagrammatic depiction of an end effector picking the backing plate of FIG. 3.

FIG. 5 diagrammatically depicts an end effector 144 that is equipped with a first vacuum port 146 and a bifurcated second vacuum port 148. The vacuum port 146 operably and selectively communicates a vacuum force acting against the backing plate 138, whereas the vacuum port 148 operably and selectively communicates a vacuum force through the backing plate 138 via openings 140. The vacuum port 146 can be isolated from opening 141 in the backing plate 138 to reduce the vacuum power needed to pick the backing plate 138.

Figure 6:
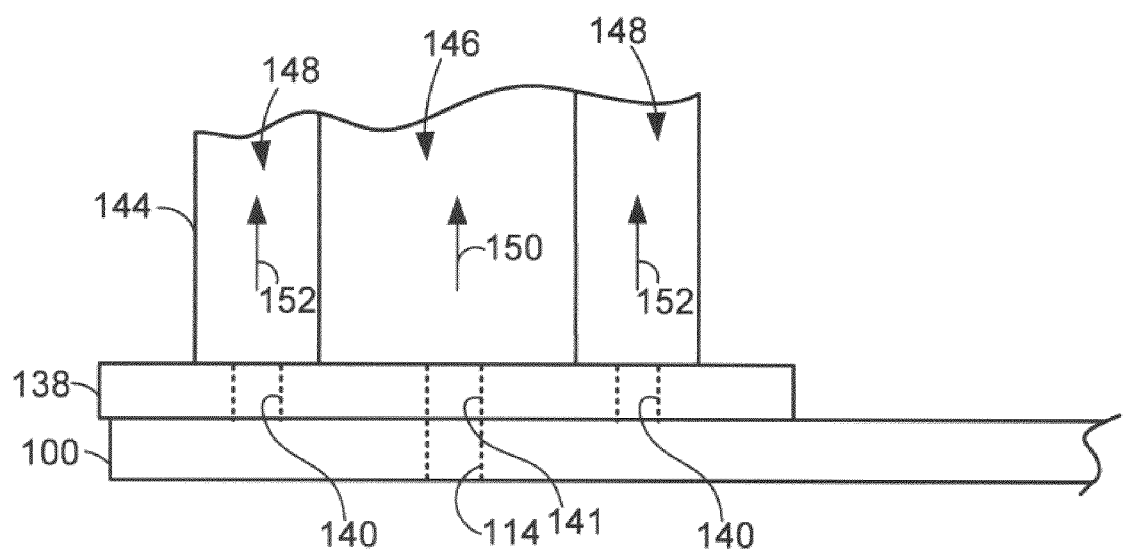
FIG. 6 is a diagrammatic depiction similar to FIG. 5 but of the end effector picking both the backing plate of FIG. 3 and the UHGA of FIG. 1.

In FIG. 5 the end effector 144 has energized the first vacuum port 146, as denoted by arrow 150, to pick the backing plate 138. In FIG. 6 the end effector has energized the first vacuum port 146, as denoted by arrow 150, and has also energized the second vacuum port 148, as denoted by arrows 152, to simultaneously pick the backing plate 138 and the UHGA 100.

The manner with which the UHGA 100 can be placed in a known position on a first surface in the precising station 130 has been described above. The manner with which the UHGA 100 can subsequently be placed on a reference surface in the test station is described below. The present embodiments contemplate an automated method for moving the UHGAs 100 into and out of the test station by first moving the end effector 144 to a picking position adjacent the backing plate 138 in a known position, and then picking the backing plate 138 by energizing port 146. The end effector 144 is then moved to a picking position adjacent a UHGA 100 that was previously aligned in the precising station 130, and energizes port 148 to pick both the backing plate 138 and the UHGA 100.

The end effector 144 can then move to position the UHGA 100 adjacent the reference surface in the test station, and then de-energize both the first vacuum port 146 and the second vacuum port 148. The backing plate 138 and UHGA 100 are thereby placed in the test station in a known position, and the end effector 144 can be clearingly moved away. After functional testing is completed, the end effector 144 can again be moved to a picking position adjacent the backing plate 138, and can then energize both the first vacuum port 146 and the second vacuum port 148 to pick the backing plate 138 and the UHGA 100 together. The end effector 144 can then be moved to an unloading area away from the reference surface in the test station. There, the end effector 144 can de-energize only the second vacuum port 148 to release the UHGA 100 while still holding the backing plate 138. The end effector 144 can then be moved to a picking position adjacent another UHGA 100 that in the meantime was aligned in the precising station 130, and by energizing the second vacuum port 148 then picks the backing plate 138 and next UHGA 100 for transfer to the test station in the same manner described above.

Figure 7:
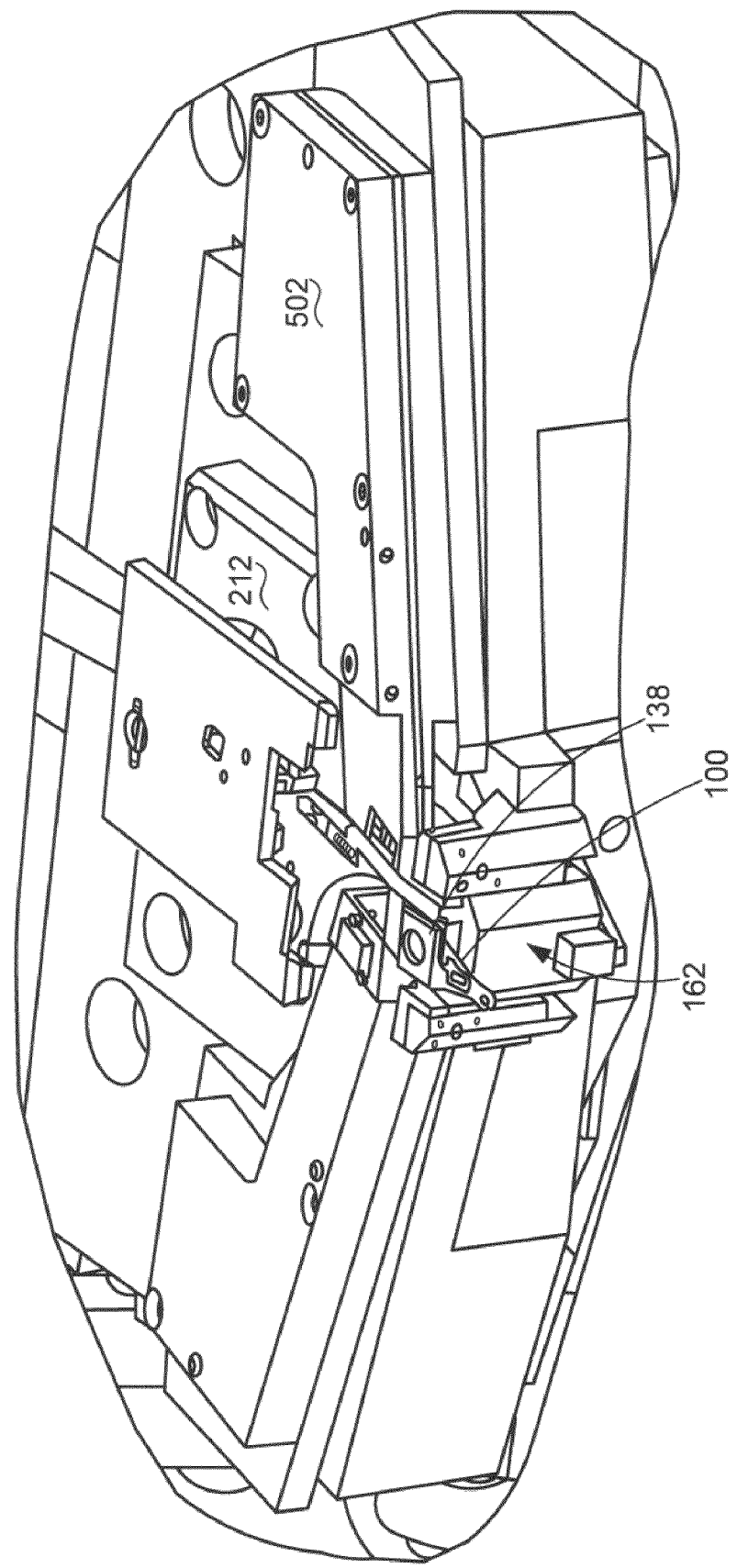
FIG. 7 is an isometric depiction of a test station suited for use in practicing embodiments of the present invention.
Figure 8:
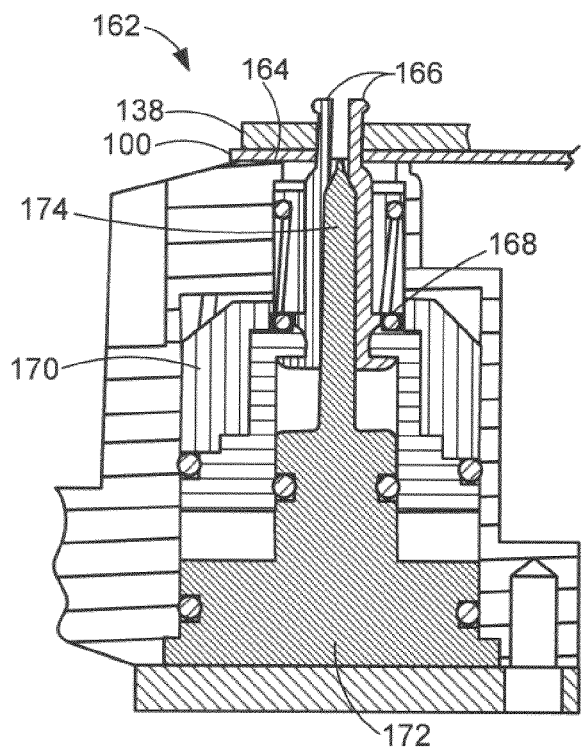
FIG. 8 is a cross-sectional depiction of the collet assembly in the test station of FIG. 7 with the collet fingers linearly extended and radially retracted in an unclamped mode.

FIG. 7 shows a test station 160 of the test process disclosed in the aforementioned copending application. The stacked backing plate 138 and UHGA 100 are placed on a collet assembly 162. FIG. 8 is a cross-sectional view showing how the stacked backing plate 138 and UHGA 100 are placed on a reference surface 164 of the collet assembly 162. In this stacked orientation the opening 141 in the body 147 of the backing plate 138 is operably aligned with the opening 114 defined by the mounting feature 110 of the UHGA 100.

The collet assembly 162 has a number of segmented collet fingers 166 that are biased inwardly to a radially retracted position by an elastomeric member 168 circumscribing a base of the collet fingers 166. It will be noted that in the radially retracted position depicted in FIG. 8 the collet fingers 166 form a relatively smaller clearing diameter, such that they clearingly pass through the mounting feature opening 114 (FIG. 1) of the UHGA 100 and the opening 141 of the backing plate 138. The collet fingers 166 are moved linearly up and down (as viewed in FIG. 8) by reciprocation of a piston 170 supported in a sliding engagement upon a stationary base 172. As the piston 170 moves downward (as viewed in FIG. 8) a tapered pin 174 portion of the base 172 spreads the collet fingers 166 apart to a radially extended position, cooperatively forming a relatively larger gripping diameter. In the radially extended position the collet fingers 166 contactingly engage the backing plate 138 with a force acting downward (as viewed in FIG. 8) in the direction of piston 170 travel.

Figure 9:
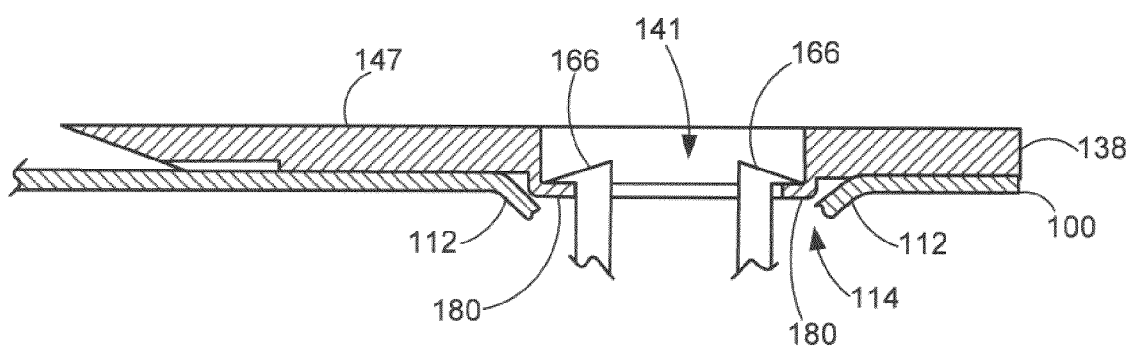
FIG. 9 is an enlarged cross-sectional view of the collet assembly in the test station of FIG. 7 with the collet fingers linearly retracted and radially extended in a clamped mode.

FIG. 9 is an enlarged cross-sectional view depicting the collet fingers 166 having been moved to the radially extended position where they each contactingly engage a lip 180 of the backing plate 138 that depends from the body 147 portion of the backing plate 138. In these illustrative embodiments the lip 180 circumscribes the opening 141 in the body 147, and is formed by an embossment extending substantially orthogonally from the body 147 that is sized to operably nest within the opening 114 of the mounting feature 110.

The collet fingers 166 impart a downward (as viewed in FIG. 9) force against the lip 180. That downward force, in turn, is transferred through the body 147 of the backing plate 138 to urge each of the contact points 143 (FIG. 4) against the UHGA 100. Note that FIG. 4 depicts the backing plate 138 defining a continuous notch 190 that clearingly disengages the body 147 from the flexible circuit 120 (FIG. 1) portion of the UHGA 100 so that the plurality of contact points 143 are not impeded in being operably urged against the UHGA 100.

Figure 10:
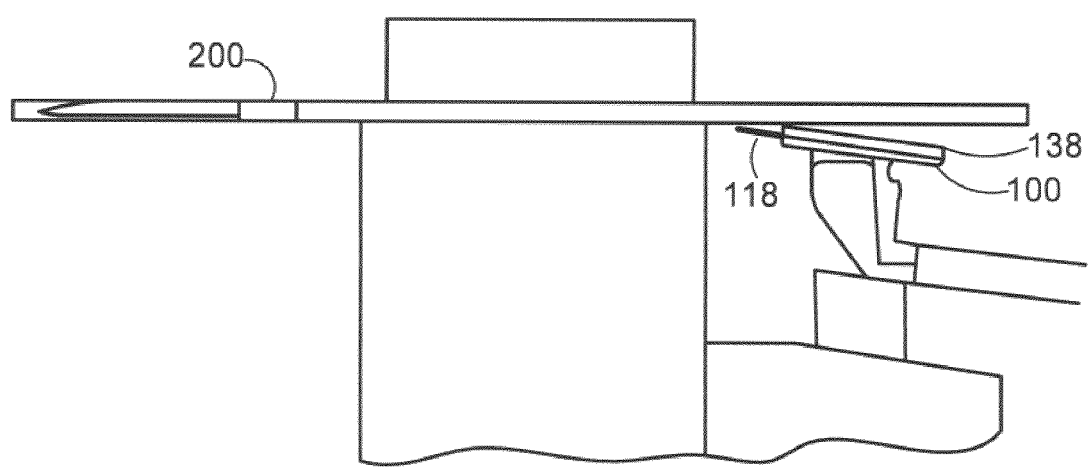
FIG. 10 is an elevational depiction of the test station of FIG. 7 showing the backing plate operably disposed between the UHGA and the disc.

In this manner, the gripping force from the collet assembly 162 can be imparted to a component that is a substantially stronger structural component in comparison to the UHGA 100 itself. That permits a more robust clamping force to be used. For example, in successful trials of the present embodiments the backing plate 138 was constructed of stainless steel and with a thickness of 0.380 millimeters. A limitation on the thickness of the backing plate 138 is the available clearance between the UHGA 100 and the disc 200 during functional testing, in which the backing plate 138 fits as depicted in FIG. 10. Another advantage of the present embodiments is associated with the clamping force being distributed across the base plate 102 portion of the UHGA 100, as defined by the number and placement of the contact points 143 (FIG. 4). In some embodiments no protuberant features are used, but rather the entire planar surface 145 is used as a continuous surface of contact points to maximize the distribution of the clamping force from the collect assembly 162.

In addition to the method steps described above, the present embodiments thus generally contemplate a method including the steps of obtaining a backing plate (such as 138) having a planar body (such as 147) defining a plurality of contact points (such as 143) and a lip (such as 180) extending from the body. The backing plate is aligned with a UHGA (such as 100), and together they are stacked upon a reference surface (such as 164). A clamping force is then applied against the lip that transfers through the body to urge each of the contact points against the UHGA and which, in turn, urges the UHGA against the reference surface.

The present embodiments also contemplate a UHGA tester. The tester has a segmented collet that expands as it is moved linearly with respect to a reference surface, and means for uniformly distributing a non-permanent fixturing force operably generated by the segmented collet to a base plate portion of the UHGA that includes a mounting feature for operably attaching the base plate to an actuator and also includes a supporting structure for supporting a flexible circuit. The "means for uniformly distributing" expressly covers the structure disclosed herein and structural equivalents thereof. Particularly, the "means for uniformly distributing" covers a structural enhancing component that effectively stiffens the UHGA, that operably distributes the clamping force across the UHGA, and that can be picked and placed with the UHGA without mechanically joining it to the UHGA. However, the "means for uniformly distributing" expressly does not encompass previous attempted solutions whereby the UHGA is mechanically attached to an intermediate fixture that is, in turn, fixtured in the test station.

The present embodiments therefore include unexpected and novel advantages as detailed herein and as can be further appreciated by the skilled artisan from the claims, figures, and description. Although some of the embodiments are described in reference to a data storage system, and even to a disc drive data storage device, the skilled artisan recognizes without enumeration that the claimed invention has various other embodiments with application to other electronic devices as well that have fragile components that must be fixtured.

It is to be understood that even though numerous characteristics and advantages of various illustrative embodiments of the invention have been set forth in the foregoing description, together with details of the structure and function of various embodiments of the invention, this disclosure is illustrative only, and changes may be made in detail, especially in matters of structure and arrangement of parts within the principles of the present embodiments, to the full extent indicated by the broad, general meaning of the terms in which the appended claims are expressed. It will be appreciated by those skilled in the art that the teachings of the present embodiments can be applied to a family of systems, devices, and means encompassed by and equivalent to the examples of embodiments described, without departing from the scope and spirit of the claimed embodiments.

What is claimed:

1. A backing plate in combination with a tester for use in non-permanently fixturing an unmounted head gimbal assembly (UHGA), the backing plate comprising:
   a planar body defining a plurality of contact points; and
   a lip extending from the body that is operably alignable with the UHGA so that a force applied against the lip transfers through the body to urge each of the contact points against the UHGA.

2. The backing plate of claim 1 wherein the lip at least partially circumscribes an opening in the body.

3. The backing plate of claim 2 wherein the opening in the body is operably alignable with an opening defined by a mounting feature of the UHGA.

4. The backing plate of claim 3 comprising an embossment extending substantially orthogonally from the body that defines the lip, the embossment sized to operably nest within the mounting feature.

5. The backing plate of claim 1 wherein the body defines a vacuum attachment opening that aligns with a solid surface of the UHGA when the lip is operably aligned with the UHGA.

6. The backing plate of claim 1 comprising a notch that clearingly disengages the body from a flexible circuit portion of the UHGA when the plurality of contact points is being operably urged against the UHGA.

7. The backing plate of claim 1 wherein the plurality of contact points define a continuous surface.

8. A method comprising:
 obtaining a backing plate having a planar body defining a plurality of contact points, and further having a lip extending from the body;
 aligning the backing plate with an unmounted head gimbal assembly (UHGA);
 placing the aligned backing plate and UHGA on a reference surface; and
 applying a force against the lip that transfers through the body to urge each of the contact points against the UHGA and which, in turn, urges the UHGA against the reference surface.

9. The method of claim 8 wherein the obtaining step is characterized by the lip at least partially circumscribing an opening in the body.

10. The method of claim 9 wherein the aligning step is characterized by aligning the opening in the body with an opening defined by a mounting feature of the UHGA.

11. The method of claim 10 wherein the obtaining step is characterized by an embossment extending substantially orthogonally from the body that defines the lip, the embossment sized to operably nest within the mounting feature.

12. The method of claim 8 wherein the aligning step comprises:
 moving an end effector adjacent the backing plate;
 energizing a first vacuum port of the end effector to impart a first suction force that picks the backing plate;
 energizing a second vacuum port of the end effector to impart a second suction force that passes through an opening in the backing plate to pick the UHGA.

13. The method of claim 12 wherein the placing step comprises:
 moving the end effector to position the UHGA adjacent the reference surface; and
 de-energizing the first and second vacuum ports.

14. The method of claim 13 further comprising:
 energizing the first and second vacuum ports;
 moving the end effector to position the UHGA away from the reference surface; and
 de-energizing only the second vacuum port to release the UHGA while still holding the backing plate with the end effector;
 moving the end effector to align the backing plate with a second UHGA; and
 energizing the second vacuum port to pick the backing plate and the second UHGA together.

15. The method of claim 8 wherein the applying a force step comprises extending a force generating member from the reference surface.

16. The method of claim 15 wherein the applying a force step is characterized by the force generating member being an expanding segmented collet.

17. The method of claim 8 wherein the obtaining step is characterized by a notch in the backing plate so that the body clearingly disengages a flexible circuit portion of the UHGA when the plurality of contact points are being operably urged against the UHGA.

18. The method of claim 8 wherein the obtaining step is characterized by the plurality of contact points defining a continuous surface.

19. The method of claim 8 wherein the obtaining step is characterized by each of the plurality of contact points defining a protuberant feature extending from the body.

20. A tester for an unmounted head gimbal assembly (UHGA), comprising:
 a segmented collet that expands as it is moved linearly with respect to a reference surface; and
 means for uniformly distributing a non-permanent fixturing force to the UHGA.

* * * * *